United States Patent [19]

Jung

[11] Patent Number: 5,227,432

[45] Date of Patent: Jul. 13, 1993

[54] BRANCHED ACRYLATE COPOLYMER WITH POLYMERIZABLE DOUBLE BONDS AND METHODS FOR THE PRODUCTION OF THE ACRYLATE COPOLYMER

[75] Inventor: Werner Jung, Ascheberg, Fed. Rep. of Germany

[73] Assignee: BASF Lacke & Farben AG, Münster, Fed. Rep. of Germany

[21] Appl. No.: 423,398

[22] PCT Filed: Mar. 24, 1988

[86] PCT No.: PCT/EP88/00242

§ 371 Date: Sep. 28, 1989

§ 102(e) Date: Sep. 28, 1989

[87] PCT Pub. No.: WO88/07555

PCT Pub. Date: Oct. 6, 1988

[30] Foreign Application Priority Data

Mar. 28, 1987 [DE] Fed. Rep. of Germany ....... 3710343

[51] Int. Cl.$^5$ .................... C08F 265/06; C08F 265/04; B32B 27/30; C09D 133/08

[52] U.S. Cl. ........................... 525/286; 525/302; 525/303; 525/304; 525/309; 428/483; 428/500; 106/287.24

[58] Field of Search ............ 525/304, 308, 309, 327.6, 525/327.7, 330.5, 330.6, 286, 303, 302; 428/483, 500; 106/287.24

[56] References Cited

U.S. PATENT DOCUMENTS

| | | | |
|---|---|---|---|
| 4,037,038 | 7/1977 | Tsuchiya | 525/386 |
| 4,067,825 | 1/1978 | Hradil | 525/340 |
| 5,115,064 | 5/1992 | Jung et al. | 526/273 |

FOREIGN PATENT DOCUMENTS

| | | |
|---|---|---|
| 0158161 | 3/1985 | European Pat. Off. . |
| 2336517 | 2/1975 | Fed. Rep. of Germany . |
| 2635122 | 2/1977 | Fed. Rep. of Germany . |
| 3319061 | 5/1983 | Fed. Rep. of Germany . |
| 3400966 | 7/1985 | Fed. Rep. of Germany . |
| 2313418 | 12/1976 | France . |

OTHER PUBLICATIONS

Translation of German Patent 3400966 published Jul. 1985.

Primary Examiner—James J. Seidleck
Assistant Examiner—Vasu S. Jagannathan
Attorney, Agent, or Firm—Kenyon & Kenyon

[57] ABSTRACT

The invention relates to acrylate copolymers with free double bonds, which are obtainable by copolymerization of a) 3 to 30% by weight of ethylenically unsaturated monomers with at least two polymerizable double bonds, b) 5 to 60% by weight of monomers with a functional group and c) other ethylenically unsaturated monomers, the sum of all the monomers being 100% by weight, and subsequent reaction of the polymer (A) formed with compounds (B) which, in addition to a group which can react with the functional groups of (A), contain at least one ethylenically unsaturated polymerizable double bond.

The invention also relates to processes for the preparation of the acrylate copolymers.

23 Claims, No Drawings

BRANCHED ACRYLATE COPOLYMER WITH POLYMERIZABLE DOUBLE BONDS AND METHODS FOR THE PRODUCTION OF THE ACRYLATE COPOLYMER

The invention relates to a method for the production of a coating means containing an acrylate copolymer with free polymerizable double bonds.

From DE-OS 33 19 061 an acrylate copolymer with free double bonds is known which is produced by transesterification of the methyl ester component of a copolymer of acrylates and methacrylates with a polyol acrylate or polyol methacrylate. The means are used in particular for the impregnation of soft material flat gaskets for combustion engines. The cross-linkage of the means takes place in the presence of heat with the addition or peroxides or by means of high-energy electron beam over the free double bonds of the methacrylate or acrylate.

Cross-linkage over the free double bonds, however, does not proceed optimally and hence the desire for a composition which readily and rapidly cures without splitting off substances with are questionable in terms of toxicology and which has good properties with respect to resistance to solvents and chemicals.

From DE-A-34 00 966 substances curable in atmospheric oxygen are known which are produced by the conversion of hydroxyl and possibly epoxy groups-containing copolymers with monocarboxylic acids with 12 to 26 C atoms and at least one olefinic unsaturated double bond. For the formation of the copolymer no monomers with more than one double bond for each molecule are used. The described substances can be processed without solvents. They are used as curable sealing substances.

From EP-A-158 161 hydroxyl group-containing acrylate copolymers are known which are produced by the copolymerization of 3 to 25 percent by weight, relative to the combined weight of all monomers, monomers having at least two polymerizable olefinic unsaturated double bonds.

By using these multiply functional monomers a branching of the acrylate copolymer is achieved. According to EP-A-158 161 the described hydroxyl groups-containing acrylate copolymers are cross-linked with melamine formaldehyde resins or with polyisocyanates. The obtained coatings have good properties with respect to resistance to chemicals and solvents. Of disadvantage, however, are the substances used for crosslinking, which from the point of view of toxicology are not quite harmless since they can split off undesirable substances. The described substances are in particular suitable for varnishwork in connection with motor vehicle repairs.

The problem on which the invention is founded is solved by a method for the production of a coating material containing an acrylate copolymer with free double bonds, which is producible in a two-stage method, characterized in that in a first stage a pre-crosslinked non-gelled acrylate copolymer (A) is produced by the copolymerization of a) 3 to 30 percent by weight ethylenic unsaturated monomers having at least two polymerizable double bonds, b) 5 to 60 percent by weight monomers with one functional group and c) further ethylenic unsaturated monomers, wherein the sum of all monomers is 100 percent by weight, in an organic solvent at 70° to 130° C., preferable at 90° to 120° C., using initiators and at least 0.5 percent by weight, preferable at least 2.5 percent by weight relative to the total weight of the monomers, of a polymerization regulator, and that in a second stage the resulting polymer (A) is converted with compounds which, apart from a group able to react with the functional groups of (b) of the polymer (A), contain at least one ethylenic unsaturated polymerizable double bond.

As component a) advantageously compounds of the general formula

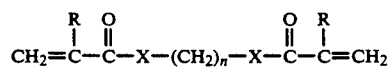
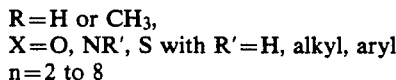

with
R = H or $CH_3$,
X = O, NR', S with R' = H, alkyl, aryl
n = 2 to 8
can be used.

Examples of such compounds are hexanediol diacrylate, hexanediol dimethacrylate, glycol diacrylate, glycol dimethacrylate, butanediol diacrylate, butanediol dimethacrylate, trimethylolpropane triacrylate, and trimethylolpropane trimethacrylate. It is understood, that also combinations of these multiply unsaturated monomers can be used. Furthermore, divinyl benzene is also suitable as component a).

The component a) can furthermore advantageously be a conversion product of a carboxylic acid having a polymerizable olefinic unsaturated double bond and glycidyl acrylate and/or glycidyl methacrylate or a polycarboxylic acid esterified with an unsaturated alcohol or unsaturated monocarboxylic acid.

Further, as component a) can be used advantageously a conversion product of a polyisocyanate and an unsaturated alcohol or amine. As example the reaction product of one mole of hexamethylene diisocyanate and two moles of allyl alcohol may be named.

A further advantageous component a) is a diester of polyethylene glycol and/or polypropylene glycol with a mean molecular weight of less than 1500 preferably of less than 1000, and acrylic acid and/or methacrylic acid.

The further polymerizable monomers of the component c) can advantageously be selected from the group comprising styrene, vinyl toluene, alkyl esters of acrylic acid and methacrylic acid, alkoxyethyl acrylates and aryloxyethyl acrylates, and the corresponding methacrylates, esters of maleic and fumaric acid. Examples are methyl acrylate, ethyl acrylate, propyl acrylate, butyl acrylate, isopropyl acrylate, isobutyl acrylate, pentyl acrylate, isoamyl acrylate, hexyl acrylate, 2-ethylhexyl acrylate, octyl acrylate, 3,5,5-trimethylhexyl acrylate, decyl acrylate, dodecyl acrylate, hexadecyl acrylate, octadecyl acrylate, octadecenyl acrylate, pentyl methacrylate, isoamyl methacrylate, hexyl methacrylate, 2-ethylbutyl methacrylate, octyl methacrylate, 3,5,5-trimethylhexyl methacrylate, decyl methacrylate, dodecyl methacrylate, hexadecyl methacrylate, octadecyl methacrylate, butoxyethyl acrylate or butoxyethyl methacrylate, methyl methacrylate, ethyl methacrylate, propyl methacrylate, isopropyl methacrylate, butyl methacrylate, cyclohexyl acrylate, cyclohexyl methacrylate, acrylonitrile, methacrylonitrile, vinyl acetate, vinyl chloride, and phenoxyethyl acrylate. Further monomers can be used to the extent that they do not lead to undesirable properties of the copolymer.

The monomer component b) can have different functional groups depending on with which compound B) the subsequent conversion takes place.

As component b) advantageously hydroxyl group-containing ethylenic unsaturated monomers are possible. Examples are hydroxyl alkyl esters of acrylic acid and/or the methacrylic acid with a primary hydroxyl group. Component b) can also be at least partially a conversion reaction product of one mole of hydroxyethyl acrylate and/or hydroxyethal methacrylate and on an average two moles of caprolactone. However, hydroxyl group-containing esters of acrylic acid and/or methacrylic acid with a secondary hydroxyl group can also, in part, be used as a monomer containing hydroxyl groups. Advantageously these are conversion products of acrylic acid and/or methacrylic acid with the glycidyl ester of a carboxylic acid with a tertiary $\alpha$-carbon atom. Examples of hydroxyl groups-containing ethylenic unsaturated monomers are hydroxyethyl acrylate, hydroxypropyl acrylate, hydroxy butyl acrylate, hydroxyamyl acrylate, hydroxyhexyl acrylate, hydroxyoctyl acrylate, and the corresponding methacrylates. Examples of OH monomers with a secondary —OH group are 2-hydroxypropyl acrylate, 2-hydroxybutyl acrylate, 3-hydroxybutyl acrylate, and the corresponding methacrylates.

In those cases, in which the monomer component with the functional group b) is a hydroxyl groups-containing monomer with an ethylenic unsaturated double bond, as reaction partner B) are used either esters of $\alpha,\beta$-unsaturated carboxylic acids, $\alpha,\beta$-unsaturated carboxylic acids, ethylenic unsaturated monomers with isocyanate groups or N-alkoxymethyl(meth)acrylamide or analog amides of fumaric, crotonic or dimethacrylic acid or compounds of the general formula (1).

$$CH_2=C-C-N-X-COOR^2 \quad (1)$$
$$\quad \; | \quad \; \| \quad \; |$$
$$\quad \; R \quad \; O \quad \; R^1$$

R = H, Me
$R^1$ = H, Alkyl, Aryl
$R^2$ = Alkyl

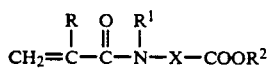

If the conversion takes place with an ester of $\alpha,\beta$-unsaturated carboxylic acids, the double bond is introduced into the acrylate copolymer through a transesterification reaction. Advantageously as component B) esters of $\alpha,\beta$-unsaturated carboxylic acids are used whose ester groups have no more than 4 to 6 carbon atoms such as, for example, methyl acrylate, ethyl acrylate, propyl acrylate, butyl acrylate, isopropyl acrylate, isobutyl acrylate, pentyl acrylate, and the corresponding methacrylates as well as the corresponding esters of fumaric acid, maleic acid, crotonic acid, dimethyl acrylic acid. The esters of $\alpha,\beta$-unsaturated carboxylic acids are converted in transesterification reactions known to the specialist with the hydroxyl groups of the previously prepared branched acrylate copolymer.

If the component B) is an $\alpha,\beta$-unsaturated carboxylic acid, then the conversion takes place with the previously prepared acrylate copolymer in a transesterification reaction.

Examples of suitable carboxylic acids are acrylic acid, methacrylic acid, crotonic acid, fumaric acid, maleic acid, and dimethylacrylic acid. Free double bonds can also be introduced into the acrylate copolymer in that the hydroxyl groups-containing acrylate copolymer is converted with isocyanate groups-containing monomers with the formation of a urethane bond. Therein it is possible that the hydroxyl groups-containing acrylate copolymer also contains exclusively secondary —OH groups. The compounds of component B) are advantageously isocyanatoalkyl esters of an unsaturated carboxylic acid of the general formula

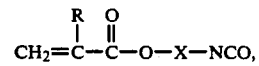

where
R=H, Me, Et and
X=$(CH_2)_n$ with
n=1 to 12. The component B) can advantageously also be an N-alkoxymethyl acrylamide or derivative or analog amide of fumaric, crotonic or dimethyl acrylic acid or a compound satisfying the general formula (1):

$$CH_2=C-C-N-X-COOR^2 \quad (1)$$
$$\quad \; | \quad \; \| \quad \; |$$
$$\quad \; R \quad \; O \quad \; R^1$$

with
R=H, Me
$R^1$=H, Alkyl, aryl
$R^2$=alkyl

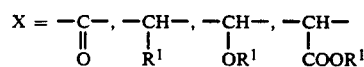

Examples for such compounds are methoxymethyl acrylamide, methoxymethyl methacrylamide, butoxymethyl acrylamide, butoxymethyl methacrylamide, isobutoxymethyl acrylamide, isobutoxymethyl methacrylamide, glycolic acid derivatives such as methylacrylamidoglycolate methyl ether, butylacrylamidoglycolate butyl ether, methylacrylamidoglycolate, and butyl acrylamido glycolate.

The branched acrylate copolymer produced in a first stage can also contain epoxy groups as functional groups. In this case the obtained acrylate copolymer is converted with a compound B) which is an ethylenic unsaturated monomer with a corboxy or amino group. Suitable monomers b) are for example glycidyl esters of unsaturated carboxylic acids or glycidyl ethers of unsaturated carboxylic acids or glycidyl ethers of unsaturated compounds. By example glycidyl acrylate, glycidyl methacrylate, glycidyl esters of maleic and fumaric acid, glycidyl vinyl phthalate, glycidyl allyl phthalate, glycidyl allyl malonate may be cited. The epoxy groups of the functional acrylate copolymer are subsequently converted with the carboxyl or amino groups of the compound B). These compounds are advantageously selected from the group comprising acrylic acid, methacrylic acid, crotonic acid, dimethyl acrylic acid, fumaric acid monomethyl ester, conversion reaction product of carboxylic anhydrides and hydroxy alkyl esters of α,β-unsaturated acids such as for example addition products of hexahydrophthalic anhydride, phthalic anhydride, tetrahydrophthalic anhydride or maleic anhydride and hydroxy ethyl (meth) acrylate, hydroxy propyl (meth) acrylate, hydroxybutyl (meth) acylate. Compound B) can advantageously also be tert-butylaminoethyl (meth) acrylate, bisacrylamido acetic acid or bis (acrylamidoethyl) amine. Preferably compounds with several double bonds are used such as, for example, bisacrylamido acetic acid.

The monomer component b) can advantageously also be a monomer with an ester function. Advantageously the esterification alcohol should contain no more than 6 carbon atoms. Hence, possible as component b) are alkyl esters of acrylic acid, methacrylic acid, crotonic acid, maleic and fumaric acid such as for example the corresponding methyl esters, ethyl esters, propyl esters, isopropyl esters, butyl esters, isobutyl esters, pentyl esters, and hexyl esters. Longer chain alcohol residues in the ester group are less favorable, since their conversion and their distillation after the conversion requires too high a temperature. The reaction partner B) is an ethylenic unsaturated monomer with —OH, —NH or —SH functions, for example hydroxy alkyl esters of acrylic acid and methacrylic acid, allyl alcohol, crotyl alcohol, methyl vinyl carbinol, allyl amine, crotyl amine, allyl mercaptan, crotyl mercaptan. The reaction product is subsequently obtained through transesterification or transamidation reactions. These reactions are known to the specialist and do not require further explanation.

The monomer component b) can also contain an -NCO group. In this manner the obtained acrylate copolymer is advantageously combined with compounds B) which are compounds with ethylenic unsaturated double bonds and an —OH, —NH, —SH or —COOH group. The monomers b) are preferably selected from the group comprising isocyanato alkyl esters of unsaturated carboxylic acids such as, for example, isocyanatoethyl(meth) acrylate, isocyanatobutyl methacrylate or vinylinic isocyanates, such as vinyl isocyanate, m-isopropenyl-α,α-simethylbenzylisocyanate. As component b)-can also be used for example addition products of isophorondiisocyanate to hydroxyalkyl(meth) acrylates such as, for example, hydroxyethyl methacrylate. It is of advantage to select for the addition such compounds which contain, apart from the —OH, —NH, —SH or —COOH function, two or more double bonds.

The monomer component b) can advantageously be an N-alkoxy methacrylamide or derivative or a compound of the general formula (1):

  (1)

with
R=H, Me
R¹=H, alkyl, aryl
R²=alkyl

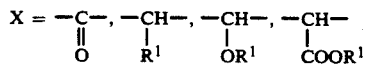

The acrylate copolymer formed in this manner is combined with compounds B) which, apart from a polymerizable double bond have —OH, —NH or —SH functions. Examples of the monomers b) are N-alkoxymethyl(meth) acrylamides such as methoxymethyl acrylamid, methoxymethyl methacrylamide, isobutoxymethyl acrylamide, isobutoxymethyl methacrylamide as well as alkoxy[(1-oxo-2-propenyl)amino] acetic acid alkyl ester.

In the production of the acrylate copolymer (A) care should be taken that a pre-cross-linked but not gelled copolymer is obtained. This is possible through suitable polymerization conditions. By using monomers having at least two ethylenic unsaturated group a pre-crosslinking of the acrylate copolymer is brought about which nevertheless does not lead to gelled products due to the special reaction conditions. It is important that the polymerization is carried out at temperatures of 70° to 130° C., preferably at 90° to 120° C., with a relatively low polymerization solid of approximately 50 percent by weight. As polymerization regulator preferably mercapto groups-containing compounds, preferably mercaptoethanol are used.

The choice of regulator depends in particular on the type of monomer component b). If the monomer component b) contains alkyl ester groups and is subsequently to be transesterified or transamidized with alcohols or amines, then it is advisable to use less or no mercapto alcohols at all as regulator since otherwise in the transesterification or transamidation the danger of premature gelling exists. If monomer component b) is an OH monomer and if the obtained —OH groups-containing polymer is to be converted with a carboxyl groups-containing compound in an esterification reaction, it is useful to use fewer or no mercapto carboxylic acids as regulator. Otherwise the danger of premature gelling exists. 2-mercapto proprionic acid in applicable is these cases since this compound has a carboxyl group at a secondary saturated carbon atom and consequently is less reactive than an α,β-unsaturated carboxylic acid.

Matching between monomers b) and the choice of regulator must always take place, furthermore, for example, primary mercaptans and ethylenic unsaturated monomers with isocyanate groups as well as glycidyl groups-containing ethylenic unsaturated monoeres and mercaptocarboxylic acids as regulators cannot be combined with each other.

The choice of polymerization initiators depends on the fraction of the multiply ethylenic unsaturated monomers used. With low content the initiators customary for such temperatures such as, for example, peroxy esters, can be used. If the fraction of the multiply ethylenic unsaturated monomers (a) is higher, initiators such as, for example, azo compounds are preferably used.

In the reaction carried out in the second stage between the acrylate copolymer (A) and component (B) reactions known to the specialist are employed such as esterification reactions, transesterification reactions, transamidation reactions, addition reactions under formation of urethane bonds, urea bonds, β-hydroxy ester groups.

The invention also relates to coating compositions which contain the pre-crosslinked, non-gelled acrylate copolymer as well as possibly pigments and organic solvents. The cross-linkage of the compositions takes place with or without peroxide in the presence of heat; with the use of peroxides at low temperatures the process is carried out with the addition of catalysts and accelerators for the decomposition of the peroxide, such as for example dimethylaniline or other amines or metal salts, or oxidatively at low temperature with the addition of desiccants or drying agents or by means of high energy electron beam over the free double bonds of the acrylate copolymer. The free double bonds-containing acrylate copolymer according to the invention which are already pre-crosslinked, can also be used as added substances to the air-drying alkyd resins or other oxidatively drying systems or to systems based on unsaturated polyesters to increase the elasticity and adhesion.

Below the invention will be explained in greater detail in conjunction with an example:

Production of a branched acrylate P1 according to the invention:

Into a 4 liter high-grade steel boiler are placed and heated to 110° C.:
  477 parts xylene
  477 parts cumene Weighed and subsequently mixed in the monomer tank are:
  150 parts hexanediol diacrylate
  250 parts hydroxymethyl methacrylate
  150 parts ethylhexyl methacrylate
  200 parts tert. butyl methacrylate
  100 parts cyclohexyl methacrylate
  150 parts styrene
  38 parts mercaptoethanol Weighed and mixed in the initiator tank are:
  28 parts 2,2'-azobis(2-methylbutanonitrile)
  56 parts xylene
  56 parts cumene The content of the monomer tank is apportioned over a period of 3 hours, the content of the initiator tank is apportioned over 3.5 hours. The feeds are started simultaneously and the temperature is maintained at 110° C. during the polymerization. The thus obtained clear acrylate resin solution has viscosity of 2.9 dPas and a solid content of 51%.

Production of component P1:

In a boiler of high-grade steel 920 parts of the previously produced acrylate resin solution are mixed with 369 parts ethyl acrylate and 2.46 parts hydroquinone monomethyl ether and 4.92 parts dibutyl tin oxide and slowly heated to 80° to 100° C. An air stream is continuously passed through the boiler. After several hours at this temperature the temperature is slowly raised to 120° C. while distilling (over columns) the ethanol, overall 520 parts of ethanol and excess ethyl acrylate and some solvent are distilled off, subsequently solvation takes place with 257 parts butyl acetate. The solid fraction of the thus obtained component P1 is 54.7%., the viscocity is 1.3 dPas.

The contents of the monomer tank are metered in over 3 hours and the contents of the initiator tank are metered in over 3.5 hours. The additions are started simultaneously, and the temperature is kept at 110° C. during the polymerization. The clear acrylate resin solution thus obtained has a viscosity of 2.9 dPas and a solids content of 51%.

Preparation of component P1:

In a stainless steel kettle 369 parts of ethyl acrylate, 2.46 parts of hydroquinone monomethyl ether and 4.92 parts of dibutyltin oxide are added to 920 parts of the previously prepared acrylate resin solution and the mixture is slowly heated up to 80° to 100° C. A stream of air is passed continuously through the kettle. After several hours at this temperature, the temperature is slowly increased to 120° C., ethanol being distilled off (through a column), and a total of 520 parts of ethanol, excess ethyl acrylate and a little solvent are distilled off, the mixture subsequently being dissolved with 257 parts of butyl acetate.

The solids content of component P1 thus obtained is 54.7% and its viscosity is 1.3 dPas.

I claim:

1. An acrylate copolymer with free double bonds produced by the reaction of:
   A) a pre-crosslinked acrylate resin produced by the copolymerization of:
      a1) 3 to 30% by weight of an ethylenically unsaturated monomer having at least two polymerizable double bonds;
      a2) 5 to 60% by weight of a monomer with a functional group; and
      a3) an ethylenically unsaturated monomer, such that the sum of components a1), a2) and a3) is 100% by weight of said resin A, and
   B) a compound containing at least one ethylenically unsaturated polymerizable double bond and a group which can react with at least one functional group from component a2 of said acrylate resin A.

2. (Amended) An acrylate copolymer according to claim 1 wherein component a1) is of the formula:

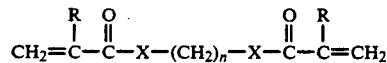

wherein
  R=H or CH$_3$,
  X=O, NR$^1$ or S,
where
  R$^1$ =H, alkyl or aryl, and
  n=2 to 8.

3. An acrylate copolymer according to claim 1 wherein component a1) is the reaction product of a carboxylic acid compound containing a polymerizable olefinically unsaturated double bond reacted with a compound selected from the group consisting of glycidyl acrylate and glycidyl methacrylate.

4. An acrylate copolymer according to claim 1, wherein component a1) is a polycarboxylic acid or unsaturated monocarboxylic acid esterified with an unsaturated alcohol containing a polymerizable double bond.

5. An acrylate copolymer according to claim 1, wherein component a1) is prepared by reaction of a polyisocyanante with an unsaturated alcohol or amine containing polymerizable double bonds.

6. An acrylate copolymer according to claim 1, wherein component a1) is a diester of polyethylene glycol or polypropylene glycol with an average molecular weight of less than 1,500 and acrylic acid or methacrylic acid.

7. An acrylate copolymer according to claim 6 wherein said polyethylene glycol or polypropylene glycol has an average molecular weight of less than 1000.

8. An acrylate copolymer according to any one of claims 1, 2, 3, 4, 5, 6 or 7 wherein component a2) is a monomer containing at least one hydroxyl group and component B is an ester of an α,β-unsaturated carboxylic acid.

9. An acrylate copolymer according to any one of claims 1, 2, 3, 4, 5, 6 or 7 wherein component a2) is a monomer containing at least one hydroxyl group and component B is an α,β-unsaturated carboxylic acid.

10. An acrylate copolymer according to any one of claims 1, 2, 3, 4, 5, 6 or 7, wherein component a2) is a monomer containing at least one hydroxyl group and component B is a monomer containing at least one isocyanate group.

11. An acrylate copolymer according to any one of claims 1, 2, 3, 4, 5, 6 or 7 wherein component a2) is a monomer containing at least one hydroxyl group and component B is an N-alkoxymethylacrylamide or has the formula:

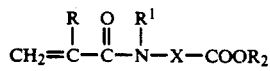

in wherein
R = H or Me,
R$^1$ = H, alkyl or aryl,
R$^2$ = alkyl and

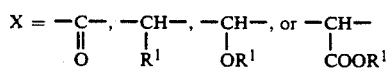

12. An acrylate copolymer according to any one of claims 1, 2, 3, 4, 5, 6 or 7 wherein component a2) is a monomer containing at least one glycidyl group and component B is an ethylenically unsaturated monomer with a carboxyl or amino group.

13. An acrylate copolymer according to any one of claims 1, 2, 3, 4, 5, 6 or 7 wherein component a2) contains an ester function with an esterifying alcohol alkyl group containing not more than 6 carbon atoms, and component B is an ethylenically unsaturated monomer with an OH, NH or SH function.

14. An acrylate copolymer according to any one of claims 1, 2, 3, 4, 5, 6 or 7 wherein component a2) contains an isocyanate group and component B is a monomer with an OH, NH, SH or COOH function.

15. An acrylate copolymer according to any one of claims 1, 2, 3, 4, 5, 6 or 7 wherein component a2) is a monomer containing at least one hydroxyl group and component B is an N-alkoxymethylacrylamide or has the formula:

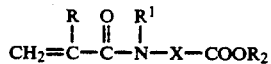

in wherein,
R = H or Me,
R$^1$ = H, alkyl or aryl,
R$^2$ = alkyl and

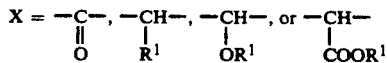

16. A process for the preparation of an acrylate copolymer with free double bonds, comprising the steps of:
A) preparing a pre-crosslinked acrylate resin A produced by the copolymerization of:
a1) 3 to 30% by weight of an ethylenically unsaturated monomer having at least two polymerizable double bonds;
a2) 5 to 60% by weight of a monomer with a functional group; and
a3) an ethylenically unsaturated monomer, such that the sum of components a1), a2) and a3) is 100 percent by weight of said resin A,
in an organic solvent at a temperature of between about 70° to 130° C. in the presence of an initiator and at least about 0.5% by weight based on the total weight of the monomers of a polymerization regulator; and
B) reacting said acrylate resin A with a component containing at least one ethylenically unsaturated polymerizable double bond and a group that can react with at least one functional group from component a2) of said acrylate resin A.

17. A process according to claim 16 wherein said temperature is between about 90° to 120° C.

18. A process according to claim 16 wherein the polymerization regulator comprises at least 2.5 percent by weight based on the total weight of the monomers.

19. A process according to claim 16 wherein said polymerization regulator is a compound containing a mercapto group.

20. A process according to claim 19 wherein said polymerization regulator is mercaptoethanol.

21. A process according to any one of claims 16, 17, 18, 19 or 20 wherein said polymerization initiator is selected from the group consisting of peroxy esters and azo compounds.

22. A coating composition comprising:
a pre-crosslinked acrylate resin (A) produced by the copolymerization of:
a1) 3 to 30% by weight of an ethylenically unsaturated monomer having at least two polymerizable double bonds;
a2) 5 to 60% by weight of a monomer with at least one functional group; and
a3) an ethylenically unsaturated monomer, the sum of components a1, a2 and a3 is 100% by weight of said acrylate resin (A) and
a component (B) containing at least one ethylenically unsaturated polymerizable double bond and a group which can react with at least one functional group from component a2) of said acrylate resin (A); and
an additional agent selected from the group consisting of pigments, catalysts, accelerators, and siccatives.

23. A coated article comprising:
A) a cured polymeric coating comprised of the reaction product of:
1) a pre-crosslinked acrylate resin produced by the copolymerization of:
a1) 3 to 30% by weight of an ethylenically unsaturated monomer having at least two polymerizable double bonds;
a2) 5 to 60% by weight of a monomer with at least one functional group, and
a3) an ethylenically unsaturated monomer, the sum of components a1), a2) and a3) being 100% by weight of said acrylate resin A),
2) a component containing at least one ethylenically unsaturated polymerizable double bond and a group which reacts with the at least one functional group from component a2) of said acrylate resin A);
3) an additional agent selected from the group consisting of pigments, catalysts, accelerators and siccatives; and
B) a substrate onto which said cured polymeric coating is coated.

* * * * *